United States Patent [19]

Grant

[11] 4,396,507

[45] Aug. 2, 1983

[54] RIBBON-TUBE BIOFILTER

[75] Inventor: Blake F. Grant, Oklahoma City, Okla.

[73] Assignee: Aqua-Est Corporation, Oklahoma City, Okla.

[21] Appl. No.: 287,058

[22] Filed: Jul. 27, 1981

[51] Int. Cl.$^3$ .............................................. C02F 3/06
[52] U.S. Cl. ................................... 210/150; 261/122; 261/DIG. 72
[58] Field of Search ...................... 210/150, 151, 615; 261/DIG. 72, 122

[56] References Cited

U.S. PATENT DOCUMENTS

| 4,181,604 | 1/1980 | Onishi et al. | 210/615 |
| 4,231,863 | 11/1980 | Sutphin | 210/151 |
| 4,246,114 | 1/1981 | Krebs et al. | 210/151 |
| 4,294,694 | 10/1981 | Coulthard | 210/150 |

FOREIGN PATENT DOCUMENTS

| 2410496 | 8/1979 | France . | |
| 743695 | 6/1980 | U.S.S.R. | 210/615 |

Primary Examiner—Benoit Castel

[57] ABSTRACT

The ribbon-tube biofilter promotes bio-oxidation ahead of clarification in wastewater treatment and functions in hydraulic pumping, oxygenation, sparging, foam fractionation, aggregate formation, and passive thermal buffering. It is operated as single-pass or with recirculation, in series and(or) in parallel. The biofilter consists of a vertical tubular column containing a parallel array of thin plastic ribbons that form multiple, linear channels and serve as non-rigid support media for heterotrophic and autotrophic bacterial colonization. Wastewater and air (or oxygen) are passed through the column by gaslift and(or) mechanical pumping coupled with air eduction or oxygen injection upstream from the support media. Linear voids between ribbons are fixed by square mesh dimensions of base and top transverse mounting grids. An outer tube forms a concentric conduit for afferent flow, which is separated from the effluent by a partition above the influent port and below the top of the removable inner column to form a collection/header chamber for the effluent. As bacterial growth and metabolism proceed to equilibrium, cells eventually become unthrifty, die, lyse, or otherwise become unstable, slough off, and are carried out with the effluent. At the effluent, evolving gas is vented, water is collected, and sediment load may be separated by a conventional clarifier.

2 Claims, 2 Drawing Figures

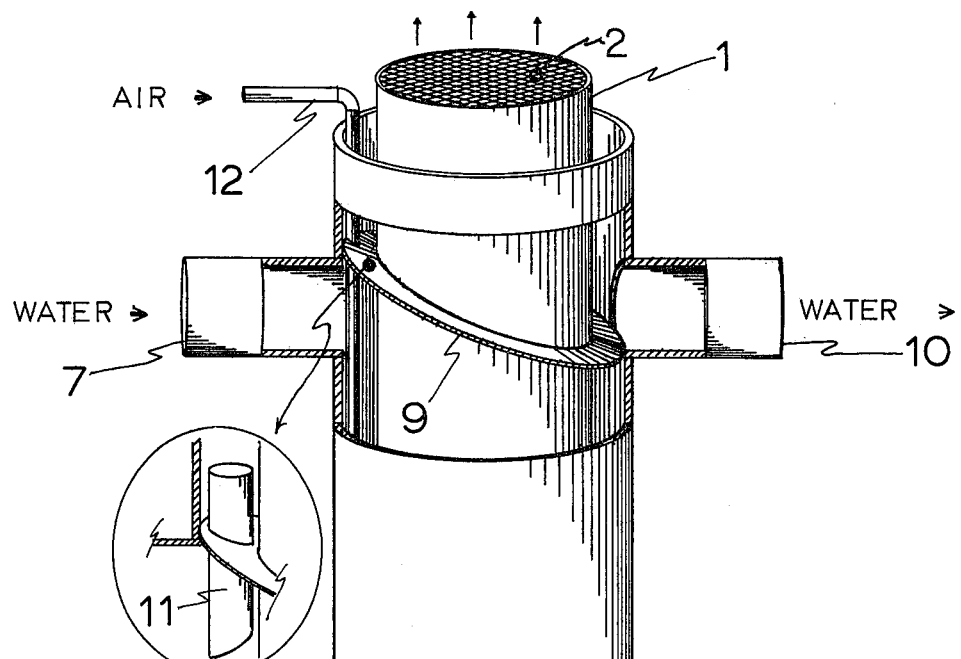
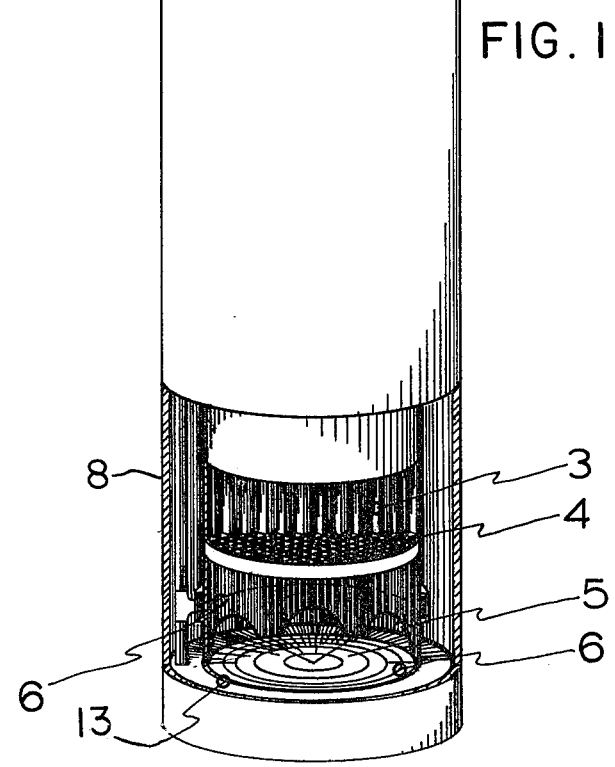
FIG. 2
FIG. 1

RIBBON-TUBE BIOFILTER

BACKGROUND OF THE INVENTION

Biofiltration, often described as partly science and partly art, is a useful process to help purify eutrophic water for reuse or before discharge. In its application, many design and maintenance problems from unknown or indeterminant causes have been resolved empirically or overcome by trial and error. A rather comprehensive literature on biofiltration has developed, attesting to the high interest in the fields of sanitary engineering and, more recently, aquaculture.

Bacteriologic filters are possible because mixtures of facultative heterotrophic and, more importantly, facultative autotrophic bacteria, especially nitrifiers, grow and metabolize reduced dissolved substances. With oxygen as an electron acceptor, they use chemical bond energy for cell growth and maintenance. (Bacteriologists have described some biofilters as "zoos.") Stalked, budding, and filamentous forms colonize physical substrate, and rod-shaped forms presumably glide through an extracellular slime, a secreted polysaccharide sol. In a few days, new biologic films replace matured, sloughed-off ones. Nitrifying bacteria, able to assimilate inorganic and organic carbon, bio-oxidize ammonia-nitrogen (Nitrosomonas) and nitrite-nitrogen (Nitrobacter) to its highest oxidation state (nitrate). Rates are proportional among other things to chemical substrate and metabolite concentration gradients (short-term) and available surface for colonization (long-term). Average temperature, pH, oxygen tension, salinity, toxicants, and their temporal variations are the other most important rate-limiting environmental variables.

Apparently, biofilters reach dynamic equilibrium with a species composition unique to the particular environment created. Cultures isolated under a certain stable set of conditions typically have narrow chemical and physical tolerances, but sufficient genetic diversity apparently is represented in "wild type" seed stock to permit selective adaptation to wide ranges of environments, each species or strain within its respective optimum. Upstream populations affect physical and chemical conditions downstream, so linear successions and corresponding spatial changes in physical and chemical environments are important considerations in biofilter design.

Practices of prior art teach that the most useful aerobic biofilters will have the best achievable balance of economy in construction, operation, and required space. High efficiency should result from minimizing rate-limiting influences typically by ordinary means. Various biofilter configurations are used, including those with stationary and(or) moved media; submersed and(or) non-submersed beds; up-, down-, or transverse-flows; mixing and reflux zones; and various adaptations and combinations of flow/media relationships. If one filter could operate with equal efficiency over broad ranges of water quality, only the best configuration would be needed.

Aerobic biofilters operating on high chemical reducing loads require provisions for equivalent oxygen mixing, typically have low hydraulic loading rates for sufficient retention time, and must have effective means to remove large quantities of biomass generated. They tend to develop thick bacterial films, becoming anaerobic in base layers, "bridge" media interstices, produce anaerobic metabolites (e.g. organic acids), and lose effective aerobic microbial habitat during the film's growth cycle. Space efficiency is sacrificed somewhat to accomodate thick films, and when films are elevated above water for high atmospheric oxygen tension, additional weight-bearing construction; material durability; and work against gravity, friction, and water displacement become significant economic factors.

Inefficiency in conventional submersed filters mainly results from occluding voids, increasing bed resistance, channeling, anaerobic zones, and intermittent, usually complicated, cleaning requirements.

Filter configurations with support media in a mixing or reflux tank for batch reaction that cannot be staged or operated stepwise within the basic unit are more restrictive, and apparently, less effective in some applications than those supporting linear successions of microorganisms that are adapted to chemically and physically different local environments within filter beds. In the latter case, sequential changes in chemical substrate quantity and quality more closely match a linearly graded spectrum of bacterial environmental requirements. The net result with single-pass operation should be better chemical substrate use, i.e. broader species diversity, and because bio-oxidation is sequential, relatively greater amounts of metabolite should reach terminal oxidation. Non-staged filters must be replicated in series to produce comparable results.

Biofilters having the capability within the basic unit for low to high recirculation rates have the advantage of diluting influent and presenting lower concentrations of chemical substrate or toxic substances to filter organisms. This benefit is at the loss of more economic single-pass operation, but recycling can also be useful for pre-conditioning filters before startup or for bioflora maintenance during "idling" when minimal maintenance growth medium may be introduced aside from the normal influent.

Applications in water reuse systems for aquaculture during recent years advanced biofiltration technology in treating water with relatively low eutrophication. Research and development have been directed toward maintaining high water quality required by intensively cultured fishes and invertebrates while conserving water and controlling artificial environments. Aquarists and fish culturists have long recognized the beneficial activity of biologic films on every available surface of reuse systems including airlift pumps used to circulate and aerate water. The latter subject received recent attention by Sutphin (U.S. Pat. No. 4,231,863), who ganged airlift pumps in a mixing tank to accomplish biofiltration. Its major weaknesses include the usual limitations of reflux systems over single-pass/recirculation systems, anaerobic zones in "dead" spaces, and poor economy in gas volume required for the amount of water processed. The latter problem stems from unequal gas flows from manifold configurations at low pressure. Non-uniform gas flows occur when water cohesion, a force overcome during gas bubble formation, is relatively high compared to the variance among pressure differentials across manifold orifices. Consequently, with low gas flows, manifolds tend to become unbalanced, partially filling with water through some ports while air flow increases at others. The net result is non-uniform distribution of gas to all reaction surfaces. This problem is partly overcome by setting manifold pressure sufficiently high that cohesion forces are insignificant compared to the variance in pressure differentials across manifold gas ports. But high gas flow rates, aside from additional pumping costs, reduce economy or contribute to overall filter inefficiency by evaporating contacted water or by making its condensation necessary by additional means, the amount being proportional to gas temperature and relative water contents.

Airlift pumps operated with less than 100 percent submergence are not as efficient as mechanical pumps in circulating water, and their advantage in combining aeration and sparging may not be more beneficial in some applications than mechanical pumping with air eduction or oxygen injection when one accounts for the air source and if $N_2$-supersaturation is undesirable. The most efficient and economic high volume/low pressure air sources, such as those from regenerative and rotary vane blowers, transfer appreciable heat and rapidly lose efficiency when operated against more than a few feet of head. Heat added to the system may be beneficial in increasing bio-oxidation rates, but this "advantage" may not be realized if water evaporation is excessive or if elevated temperature cannot be tolerated in the effluent. Further, if effluents are to be used in aquaculture, air injection against only five feet of hydrostatic head produces $N_2$-supersaturation that can be just tolerated by most sensitive species tested. Loading stress increases up to about ten feet, the point of lethal stress. Consequently, submersed biofilters using air are limited in vertical displacement in aquaculture applications, or provisions for $N_2$ degassing must be made. The economic advantage of using air over compressed or aspirated oxygen makes vertical space premium, so for high efficiency, maximal effective reaction surface/bed volume is imperative.

Using free-sedimenting particulates to increase surface area generally enhances biomass in filters, but problems arise in keeping them suspended in active zones of optimal contact with chemical substrate and in separating them from film growth and metabolic products. Floating, caged media, such as spheres, allow for good chemical substrate contact when tumbled about but have the disadvantage of requiring substantial work against gravity and friction, as well as having relatively low surface area/volume ratios. Typically, biofilters with moved media alternating contact with water and air have weight bearing problems and continually expend energy in lifting wet media, overcoming friction, and displacing water. Moved-media filters enhance bio-oxidation rates primarily by continually renewing chemical concentration gradients to and from nitrifying bacteria while concentrating biomass and effectively shedding sloughed growth. They can be staged and have low bed resistance in trough configurations but will not automatically recycle and do not offer maximal thermal buffering to the bio-oxidation process.

Self-cleaning of solids enhances process efficiency. Stationary media in optimal configuration uses flow shear and gravity to separate sloughed colonies and adsorbed aggregates of insoluble organic material from support media. If the slime matrix is kept thin, e.g. by water shear, aerobic metabolism may occur throughout the film layer. Filters whose basic configuration provides effective means to remove reduced solids from its reaction environment offer improved efficiency.

In airlifts gas flow can be in slugs or bubbly. Bubbly flow, less efficient for pumping because of slip, is more effective in foam fractionation of water enriched in surfactants. Gas bubbles also aid in dissolved waste reduction by inducing aggregate formation. Biofilters featuring foam fractionation and aggregate formation should have enhanced efficiency.

In the present context of biologic filtration, the ribbon-tube biofilter satisfies most practical and theoretical criteria and could be considered a standard for performance comparisons in a broad spectrum of applications. Several features advancing the art are based on the filter's unique configuration, which is designed to maximize process efficiency and permit wide utility with minor modification of the basic unit.

(1) Configuration provides for complete separation of influent from effluent water with single-pass operation or for recycling with percentages selectable over full range. Batch reflux is replaced by progressive microzone reflux with an instream gas phase.

(2) A parallel array of flexible, lightweight ribbons as the support medium accounts for high space and construction efficiency while promoting self-cleaning and maximal effective aerobic habitat. Filter bed and water conduits eliminate "dead" zones for anaerobic activity. Lateral communications equalize transverse pressure gradients and slight ribbon flexures prevent bridging. The parallel ribbon array helps to confine chemical substrate flow to ultimate reaction zones, whereas uniform linear voids eliminate channeling by creating equal bed resistance. Streamlined flow helps water shear force to maintain thin biologic films for maximal aerobic metabolism while reduced solids are displaced continually from the filter bed.

(3) Geometric configuration is adaptable to heat transfer for thermal isolation or buffering (a) from filter bed to substrate (e.g. earth) or the converse, and (b) by counter-current transfer between influent and filter bed.

(4) Effective surface area/volume approaches maximal practical limits for submersed bio-oxidation filters combining features of equivalent oxygen mixing, pumping, sparging, foam fractionation, aggregate formation, thermal buffering, voiding solids and minimizing evaporation.

(5) Point source gas introduction, with gas flows relatively low in proportion to filter surface area, obviates critically narrow tolerances in diffuser orifice diameter and elevation.

(6) In equivalent modes, the filter may be operated counter-current against gaslift or with gas entrainment to accomplish oxygenation, but this requires external means to compensate for head loss and altered capacity to void solids.

(7) Durable lightweight construction with high space-efficiency and material economy makes the filter bed component easily portable.

(8) Point source discharge of sparging gas and foam facilitates disposal or reclamation for by-product use.

SUMMARY OF THE INVENTION

The ribbon-tube biofilter is a device to promote bio-oxidation of reduced dissolved substances prior to clarification in wastewater treatment. It also incorporates hydraulic pumping, aeration or oxygenation for residual dissolved oxygen, foam fractionation, aggregate formation, sparging, and passive thermal buffering. Operating principles are based on characteristics of biologic oxidation of dissolved wastes, aerobic bacteria's environmental requirements, in-line flow hydraulics, reactants' mass action, and heat transfer. The mechanism consists of a vertical tubular column containing a parallel array of thin plastic ribbons that form multiple non-rigid channels and serve as support media for colonization by autotrophic and heterotrophic bacteria. Wastewater containing dissolved and microsuspended organics along with oxygen are passed upward through the column by airlift and(or) by mechanical pumping coupled with air eduction or oxygen injection upstream from the support media. After initial colonization, bio-oxidation and cell regeneration proceed to equilibrium, a rate mainly determined by temperature, waste concentration, pH, oxygen tension, salinity, hydraulic loading rate, and toxic materials. As bacterial growth and metabolism proceed, localized cell masses in the secreted extracellular slime or biologic film die, lyse, or otherwise become unstable, slough off, and are carried out with the filter effluent, freeing the original surface for recolonization and making the process a continuing cycle. Gas bubbles create progressive water flow gradients during their displacement and unthrifty, disfunctional film matrices, subjected to cyclic pressure waves, detach and are carried out of the ribbon channel. The biologic film gets standing diffusion gradients of nutrient to and metabolite from bio-oxidation zones. Water channels are set to the narrowest practical limits as determined by biologic film thickness. The ribbon-tube module is operated in series and parallel configurations. Its best anticipated mode is complete flow-through, but it can readily be made to recycle variable volumes, diluting influent with treated water by maintaining the discharge hydrostatic head higher than that of the influent and proportioning effluent into influent through a regulated circuit. This operation, however, is not that of an internal circulation, reflux system wherein inflow is allowed to randomly mix with outflow, possibly short-circuiting active filter zones. An outer concentric tube forms a conduit for the afferent flow. It is partitioned above the influent port to form a collection/"header" chamber for the effluent. Voids between ribbons are fixed by square mesh dimensions of base and top transverse mounting grids. Grid dimensions may be set in proportion to biologic film thickness or to organic/hydraulic loading rates. Hydraulic loading rates are varied by percent submergence or by air and(or) water pumping rates, or percent recycling to achieve optimal retention time and sufficient oxygen tension through the filter bed. Oxygen-enriched air or undiluted oxygen may be supplied to permit improved thermal isolation of filters from air temperature, to increase residual dissolved oxygen, or to sparge nitrogen, hydrogen sulfide, carbon dioxide, and ammonia.

More elaborate but similar construction and operation employ the following. Permeable ribbons with patent cores conduct gas to the lower mounting grid, gas bubbles released create gaslift and form the diffusion gradient toward outer biologic film layers, and permeable ribbons pass oxygen to inner biologic film layers.

When oxygen conservation is the more practical consideration, effluent gas may be captured, stripped of unwanted gases, and recycled. Biofiltration byproducts such as nitrate and other electrolytes may be used, along with light and plants to achieve denitrification and replenishment of oxygen by photosynthesis in a peripheral circuit. The filter's geometric configuration, typically having length to diameter ratios 10 to 1 or greater, favors placement below ground or into another heat conduction medium to help achieve thermal stability as influenced by heat transfer among introduced gas, heat of vaporization, water flowthrough, and the earth or other heat conduction medium. Peripheral devices may be used to control major sources of heat transfer and other reaction variables to maximize and further stabilize bio-oxidation rates.

In a somewhat equivalent mode, the inner ribbon-tube module may be inclined 60 degrees from horizontal, with the two planes formed by ribbon surfaces set at 45 degrees from the axis of inclination, to accomplish biofiltration combined with sedimentation. Provisions to remove solids from a bottom compartment similar to that of tube clarifiers and plate separators are required. In this mode tops of ribbon surfaces become partly anaerobic but serve to conduct solids downward and through channel communications ultimately to the tube wall. The lower tube wall collects and conducts solids toward the lower grid for removal.

BRIEF DESCRIPTION OF THE DRAWINGS

FIG. 1 is an elevation view of a ribbon-tube biofilter with parts cut away to show inner features in cross-section.

FIG. 2 is an exploded view of the adjustable standpipe of the ribbon-tube biofilter shown in FIG. 1.

DETAILED DESCRIPTION

The ribbon-tube module (1) consists of a vertical tube (e.g. thin-wall extruded polyvinylchloride duct) with a top grid (2) (e.g. stainless steel wire threaded parallel along the transverse plane at intervals nominally half an inch apart, and then, similarly threaded along the transverse plane at right angles to the first plane to form a square mesh) supporting loop-ended ribbons (3) (e.g. $0.002 \times 0.5$ inch Mylar film) strung between a lower grid (4) (made like top grid) in water and gas streams from lower ports (5) and diffuser (6), respectively. The module and appurtenances consisting of a gas pipe (12), adjustable standpipe (11), and partition (9), sit in a concentric, recessed floor (13) of a cylindric sump (e.g. reinforced concrete well curbing). Water entering influent pipe (7) flows downward through the space between the ribbon-tube module (1) and the sump wall (8), through ports (5) and the ribbon tube interstices, into a header chamber formed by the upper sump wall and partition (9), and out the effluent pipe (10). An adjustable standpipe (11) in coordination with inflow and outflow valves (not shown) sets recycle volumes. A blower (not shown) driving gaslift and supplying oxygen connects to the gas pipe (12).

Water displacing introduced gas (20 to 100 percent oxygen) carries nutrient and oxygen into intimate contact with over 95 ft$^2$ of surface area per 1 ft$^3$ of volume that provides habitat for a biologic film of periphytic heterotrophs and autotrophs. The presumptive biologic film grows and develops zones of bio-oxidation attaining equilibrium according to complex biologic, physical, and chemical interactions characterized by parameters of temperature flux, concentration gradients, species makeup, biomass, etc. The habitat thus created limits biologic film thickness by water shear force and slight ribbon flexure such that unstable biomass detaches and is carried away to be replaced by new growth. Ribbons forming right angles at their margins flex and scour lateral growth that precedes layered growth, such that thin films tend to be maintained. Thin biologic films and high oxygen tensions favor aerobic over unwanted anaerobic metabolism.

In the example depicted (1/16 in. = 1 in.), the ribbon-tube demensions are 22 in. diameter $\times$ 12.9 ft. long or about 34 ft$^3$ in volume. With half-inch ribbons, the surface area is, 8 (ribbons/in$^2$)×12.9/12 (ft$^2$/linear ft)×380 (cross-section area)=3268 ft$^2$;

and

3268/34=96 ft$^2$/ft$^3$. In applications where quarter-inch ribbons may be used, the area per volume doubles, giving over 6000 ft$^2$ for the 22 in.×12.9 ft. ribbon-tube filter depicted in FIG. 1.

In applications treating wastewater with surfactant enrichment, foam accumulates in the header chamber and is skimmed from water by its overflow (collection not shown).

I claim:

1. An apparatus for biological wastewater treatment, comprising:

an exterior chamber having an upper end and a closed lower end, the exterior chamber communicating with an influent conduit disposed adjacent the upper end of the exterior chamber;

an interior chamber disposed at least partially within the exterior chamber, the interior chamber having an open lower end communicating with the exterior chamber and an upper end, the lower end of the interior chamber disposed adjacent the lower end of the exterior chamber, the interior chamber communicating with an effluent conduit disposed adjacent the upper end of the interior chamber;

a vertical contactor column disposed at least partially within the interior chamber, comprising:

a lower transverse grid disposed adjacent the lower end of the interior chamber and having a plurality of mesh openings formed therein;

an upper transverse grid having a plurality of mesh openings formed therein; and an array of flexible ribbons serving as support media for bacterial colonization, each ribbon attached at opposite ends to the upper and lower transverse grids, the array of ribbons defining a plurality of substantially enclosed passages, each passage extending longitudinally between the upper and lower transverse grids and communicating with a mesh opening in each grid, each ribbon capable of supporting bacterial film thereon;

means for establishing a flow of air through the lower transverse grid and the vertical contactor column; and means for transfering liquid from the interior chamber, adjacent its upper end, to the region between the walls of the exterior and interior chambers.

2. The apparatus of claim 1, wherein said ribbons are 1 inch or less wide and 0.002 inch or less thick.

* * * * *